US006305080B1

(12) United States Patent
Komuro et al.

(10) Patent No.: US 6,305,080 B1
(45) Date of Patent: Oct. 23, 2001

(54) METHOD OF MANUFACTURE OF INK JET RECORDING HEAD WITH AN ELASTIC MEMBER IN THE LIQUID CHAMBER PORTION OF THE SUBSTRATE

(75) Inventors: Hirokazu Komuro, Yokohama; Takashi Fujikawa, Isehara; Ken Tsuchii, Sagamihara; Norio Ohkuma, Machida; Hideto Yokoi, Yokohama; Shuichi Murakami, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/215,738

(22) Filed: Dec. 17, 1998

(30) Foreign Application Priority Data

Dec. 19, 1997 (JP) .................................................. 9-351347

(51) Int. Cl.[7] ............................. H05B 3/06; G01D 15/16

(52) U.S. Cl. ..................... 29/890.1; 29/611; 29/DIG. 16; 216/27; 216/49; 216/99; 347/61

(58) Field of Search ................................. 216/23, 27, 39, 216/49, 99; 29/890.1, 25.35, 611, DIG. 16; 347/26, 56, 61

(56) References Cited

U.S. PATENT DOCUMENTS 4,601,777 * 7/1986 Hawkins et al. ....................... 216/27
4,860,033 8/1989 Shiozaki et al. .
5,308,442 * 5/1994 Taub et al. ............................ 216/27
5,322,811 6/1994 Komuro et al. ....................... 437/51
5,458,254 * 10/1995 Miyagawa et al. .................... 216/27
5,479,197 12/1995 Fujikawa et al. ...................... 347/63
5,485,185 1/1996 Sueoka et al. ......................... 457/64
5,491,505 2/1996 Suzuki et al. ........................ 347/203
5,580,468 12/1996 Fujikawa et al. ...................... 216/27
5,697,144 * 12/1997 Mitani et al. .......................... 219/27
5,804,083 * 9/1998 Ishii et al. ............................. 216/27
5,989,445 * 11/1999 Wise et al. ............................ 216/39

OTHER PUBLICATIONS

Bassous, E., Fabrciation of Novel Three–Dimensional Microstructures by the Anisotropic Etching of (100) and (110) Silicon, IEEE Transactions, vol. ED–25, No. 10, Oct. 1978.*

Petersen, Kurt E., Fabrication of an Integrated, Planar Silicon Ink–Jet Structure, IEEE Transactions on Electron Devices, vol. ED–26, No. 12, Dec. 1979.*

* cited by examiner

*Primary Examiner*—Lee Young
*Assistant Examiner*—A. Dexter Tugbang
(74) *Attorney, Agent, or Firm*—Fitzpatrick, Cella, Harper & Scinto

(57) ABSTRACT

A method for manufacturing an ink jet recording head, which is provided with orifices for liquid discharge use, nozzles communicated with the orifices, electrothermal converting members arranged in the nozzles to form bubbles in the liquid by providing thermal energy for it, the liquid chamber communicated with the nozzles to supply liquid to the nozzles and a substrate having the electrothermal converting members provided therefor, comprises the steps of preparing the substrate to be a silicon substrate having (100) plane or (110) plane crystal axes therefor, forming organic resin layer at least in the liquid chamber on the silicon substrate, then, removing by means of anisotropic etching a part of the liquid chamber formation portion of the substrate from the reverse side of the formation surface of the organic resin layer and forming an elastic member portion formed by the membrane of the organic resin layer in the liquid chamber. With the method of manufacture thus arranged, it is possible to provide an ink jet recording head capable of performing stable discharges for a long-term use with the incorporation of such elastic member portion in the liquid chamber to absorb the pressure vibration caused by the performance of ink discharges and to suppress the resultant vibrations of menisci at the discharge ports.

4 Claims, 3 Drawing Sheets

METHOD OF MANUFACTURE OF INK JET RECORDING HEAD WITH AN ELASTIC MEMBER IN THE LIQUID CHAMBER PORTION OF THE SUBSTRATE

BACKGROUND OF THE INVENTION

1. Field of the Invention

The present invention relates to the liquid chamber of an ink jet recording head, and a method for manufacturing an ink jet recording head capable of maintaining bubbles stably in the ink supply system, as well as performing stable ink discharges continuously. More particularly, the invention relates to an ink jet recording head provided with a structure specifically arranged to enable bubbles to be kept stably in the ink supply system thereof, and also, relates to the method of manufacture therefor.

2. Related Background Art

In recent years, along with the popularization of computers, various kinds of application equipment have been developed vigorously. Particularly, remarkable is the development and of various kinds office automation of equipment such as copying machines, facsimile equipment, word processors, and personal computers.

An output devices as a printer, has become prerequisite as the output of the data, documents, and the like processed by such office automation equipment.

Conventionally, printer of various kinds, there have been used, such as a wire-dot printer or other impact type printer, a laser beam printer which uses an electrostatic copying system, and a thermal transfer printer or other non-impact type printer. In recent years, attention has been given to the excellent characteristics of the performance of the ink jet recording printer, and the developments of various kinds of ink jet type printers are in progress.

It is of course desirable to produce beautiful and precise prints and images by use of a printer, and the objectives of the ink jet printer technologies and techniques including improving such image formation.

To this end, the ink jet recording head should be able to discharge ink at higher speeds in higher density, first of all, by use of smaller ink discharge nozzles.

Then, for the ink jet recording head, such smaller ink discharge nozzles should be arranged closely to enhance its performance. To achieve these objectives, there is known the method of manufacture which uses the microlithography technologies to execute fine processing for the provision of many of discharge ports which are arranged closely.

FIG. 4 is a view (perspective view of the outer appearance) which shows a structural example of an ink jet head manufactured as described above. In FIG. 5, heaters 101 are formed on a silicon substrate 100 (not shown), for example. Then, a wall is formed on the heaters by use of photosensitive resin for the formation of nozzles and liquid chamber, and, further, a glass plate (ceiling plate) 107, which is provided with the liquid chamber 114 and the supply opening, is bonded to the wall thus formed (see FIG. 2H). Then, lastly, the ink tube is bonded to it, thus completing an ink jet head. Here, the nozzles are arranged at pitches of 360 dpi, for example.

When ink is discharged from an one nozzle in an ink jet recording head provided with a plurality of nozzles, the ink that resides behind this nozzle moves backward in the direction of the liquid chamber in reaction to the kinetic energy exerted by the discharged ink droplet, thus causing the resultant pressure changes in the liquid chamber. The pressure changes thus exerted cause the vibrations of the menisci of nozzles, which are not engaged in discharging at that time.

When such vibration of menisci takes place, an ink droplet may become larger than when the menisci are stationary if, for example, ink is discharged from a certain nozzle whose meniscus is pushed out forward or an ink droplet may become smaller if it is discharged from a certain nozzle whose meniscus is pulled back at that time.

As described above, the pressure changes in the liquid chamber caused by ink discharges produce unfavorable effect on the nozzles of a head as a whole, which may impede the continuous performance of stable discharges and decrease print quality inferior.

Particularly when the number of nozzles is large or the driving frequency is higher, the unfavorable effect of the meniscus vibration becomes greater and may even make it impossible to obtain continuous discharges.

In order to prevent the menisci from being vibrated, a dumper is provided for the liquid chamber or ink supply system in some cases for the suppression of the pressure changes in the liquid chamber.

As a first prevention measure, the ink supply tube is formed by an elastic material such as silicon tube so as to absorb the pressure vibrations. However, this method is not good enough to obtain the anticipated effect unless the supply tube is located in the vicinity of the nozzles. As a result, the designing freedom is extremely limited. Also, if the numbers of nozzles is increased, the supply tube will be positioned away from them inevitably. Then, this first preventive measure is no longer effective. Also, since the silicon tube has a good gas permeability, air tends to penetrate this tube and create bubbles in it, hence impeding the ink supply after all.

As a second preventive measure, bubbles are induced into the interior of the liquid chamber so as to absorb the pressure vibrations. However, this method is not good enough, either, because with a bubble trapping structure formed in the liquid chamber, bubbles are dissolved into ink and disappear as time elapses even if bubbles are provided in such trap when ink is initially filled in it.

Also, if the head itself is structured so as to take in bubbles easily, it becomes difficult, on the other hand, to maintain bubbles in a stabilized condition. As a result, the ink supply becomes difficult to maintain causing disabled discharge unless bubbles are removed from the nozzles or ink supply system by means of frequent recovery operations or the like.

As described above, there has been no way in the conventional art to suppress the ink pressure vibrations in the liquid chamber without affecting the operations of other parts, not to mention the permanent control thereof.

SUMMARY OF THE INVENTION

The present invention is designed in consideration of the problems discussed above. It is an object of the invention to provide an ink jet recording head capable of performing stable ink discharges by the incorporation of an elastic member portion, having none of the problems discussed above, on the substrate so as to absorb the pressure vibrations in the liquid chamber caused by the performance of ink discharges, and suppress the resultant vibrations of menisci at the discharge ports.

With the present invention described hereunder, it is possible to solve the problems encountered in the conventional art, and at the same time, to achieve the objectives hereof.

In other words, the method of the present invention for manufacturing an ink jet recording head, which is provided with orifices for liquid discharge use; nozzles communicated with the orifices; electrothermal converting members arranged in the nozzles to form bubbles in the liquid by providing thermal energy for it; the liquid chamber communicated with the nozzles to supply liquid to the nozzles; and a substrate having the electrothermal converting members provided therefor, comprises the steps of preparing the substrate to be a silicon substrate having (100) plane or (110) plane crystal axes therefor; forming organic resin layer at least in the liquid chamber on the silicon substrate; then, removing by means of anisotropic etching a part of the liquid chamber formation portion of the substrate from the reverse side of the formation surface of the organic resin layer; and forming an elastic member portion formed by the membrane of the organic resin layer in the liquid chamber.

Also, in accordance with the method of the present invention for manufacturing an ink jet recording head, the organic resin layer functions dually as the protection layer of the electrothermal converting members, and further, the organic layer is epoxy resin.

Also, an ink jet recording head of the present invention is a head obtainable by the method of manufacture described above.

DETAILED DESCRIPTION OF THE PREFERRED EMBODIMENT

Hereinafter, the present invention will be described specifically in accordance with an embodiment thereof.

The invention is designed to provide a method for permanently absorbing the pressure changes caused by the discharges with an elastic member portion which is formed in the liquid chamber and nozzles.

The ink jet recording head is provided with a thermal activation portion, which creates bubbles in liquid by the application of thermal energy to it, and which is communicated with orifices for liquid discharge; the electrothermal converting members that generate such thermal energy; and a substrate having the thermal activation portion arranged on it and having an upper protection layer. The substrate is formed by silicon whose crystalline axes are (100) plane or (110) plane, and at least a part of the upper protection layer is formed by an organic resin layer. The substrate below such organic resin layer is partly removed by means of anisotropic etching, hence the portion thus removed becoming a void. In this manner, it is attempted to solve the problems discussed above.

More specifically, the thermal activation portion is formed on the substrate having the (100) plane or (110) plane, and then, the layer containing organic resin is formed as the upper protection layer. Thus, after the heater board is completed, the silicon substrate is etched using a desired pattern by means of anisotropic etching from the back side thereof up to the organic resin layer serving as the upper protection layer.

In this way, the organic resin layer is formed on the substrate as the elastic member portion, and it becomes possible to form the elastic member portion in the location as required at lower costs, hence solving the problems encountered in the conventional art.

Now, with reference to the accompanying drawings, the detailed description will be made of the present invention in accordance with the embodiment thereof. In this respect, however, it is to be understood that the invention is not necessarily limited to the embodiment described herein.

Figure 1:
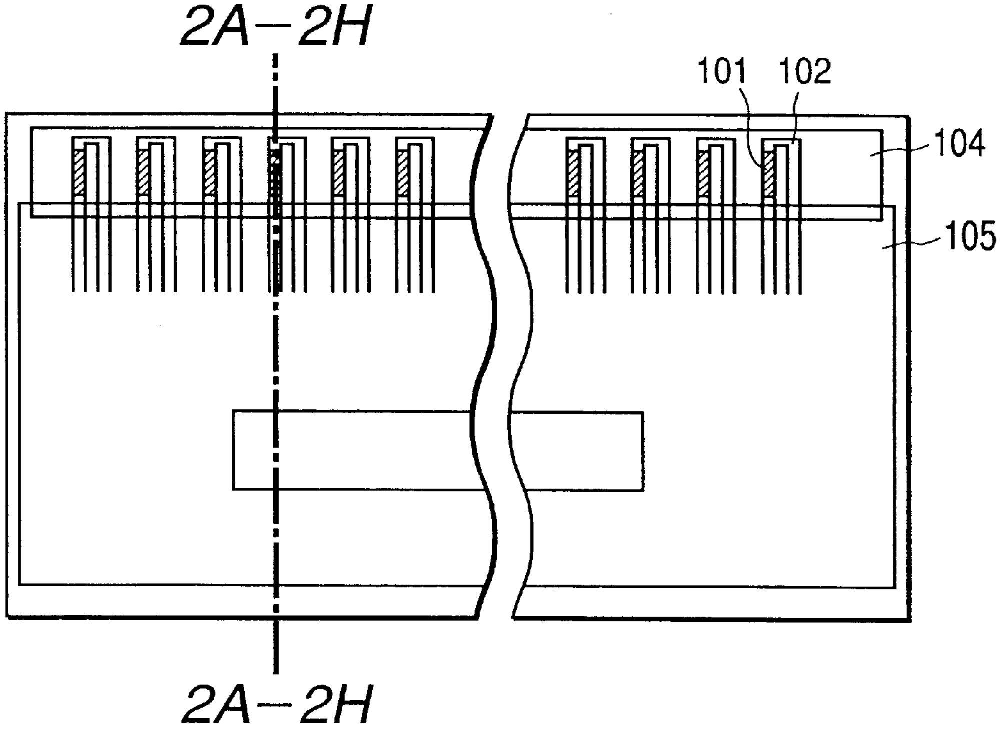
FIG. 1 is a plan view which schematically shows a heater board in accordance with the embodiment of the present invention.
Figure 3:
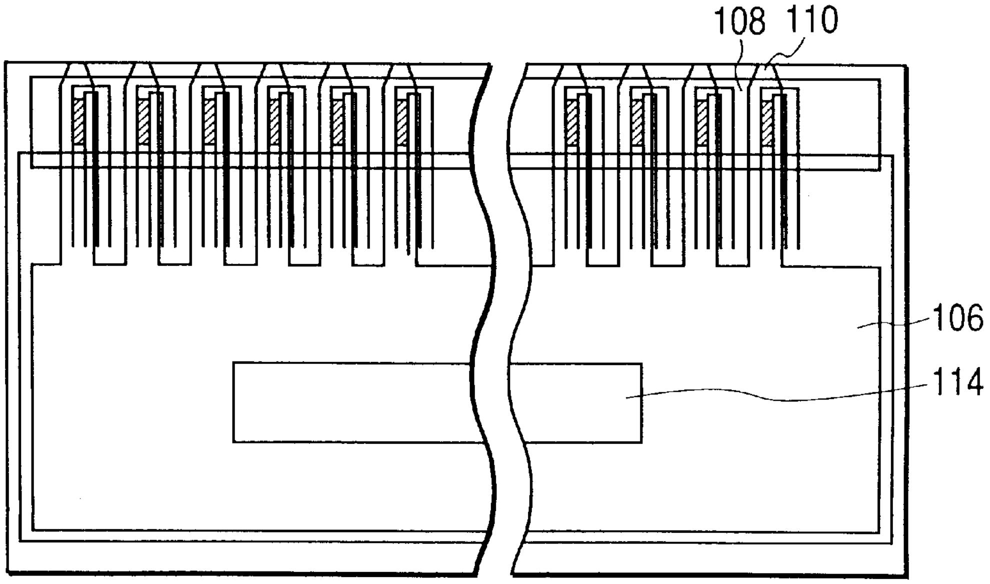
FIG. 3 is a plan view which schematically shows an ink jet head in accordance with the embodiment of the present invention.
Figure 4:
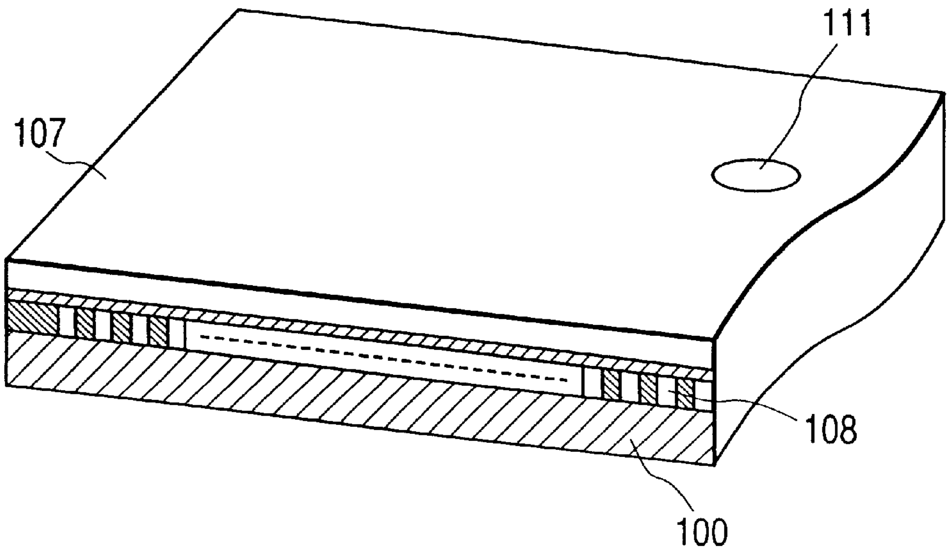
FIG. 4 is a perspective view which briefly shows the outer appearance of an ink jet recording head.
Figure 5:
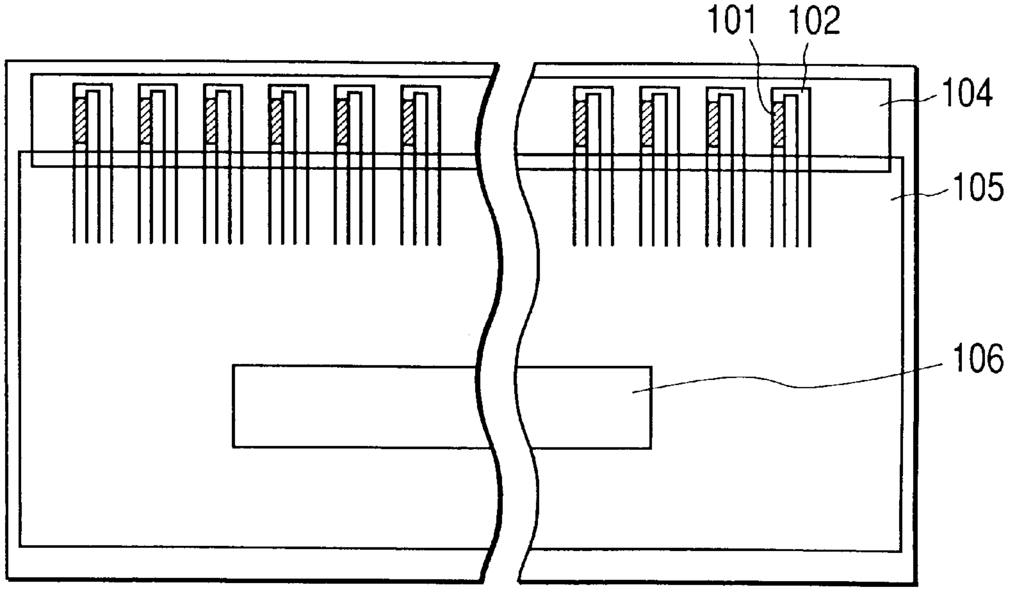
FIG. 5 is a plan view which schematically shows the heater board in accordance with the embodiment of the present invention.

FIG. 1 is a plan view which schematically shows the heater board of the present invention. FIGS. 2A to 2H are cross-sectional views which illustrate the manufacture processes of the heater board represented in FIG. 1, taken along line 2A—2A to 2H—2H. FIG. 3 is a plan view which shows the ink jet head of the present invention. FIG. 4 is a perspective view which shows the outer appearance of an ink jet head.

(Embodiment)

Now, hereunder, the description will be made of the embodiment of the present invention in accordance with the specific processes of the manufacture of the head.

First, a silicon substrate having the (100) plane is prepared in a thickness of 625 $\mu$m. Then, a SiN film 112 is formed on it by the application of CVD method in a thickness of 1 $\mu$m both on the surface where the thermal activation portion is formed and on the reverse side thereof.

Figure 2A:
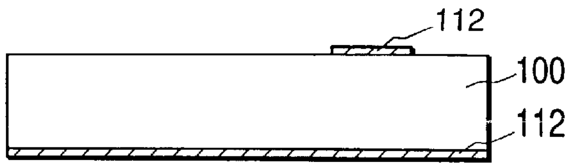
FIGS. 2A, 2B, 2C, 2D, 2E, 2F, 2G and 2H are views which illustrate the manufacture processes of the heater board embodying the present invention.
Figure 2B:
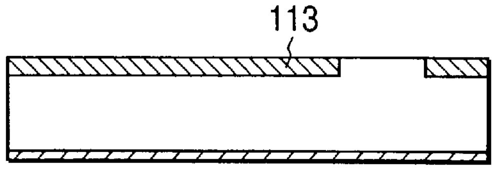

Then, the SiN film on the surface where the thermal activation portion is formed is patterned to leave the SiN film 112 intact only on the portion where the elastic member portion should be arranged (see FIG. 2A).

Subsequently, this substrate is placed in the thermal oxidation furnace to thermally oxidize it to form a layer 113 of thickness of 1.0 $\mu$m with the usual method. After that, the SiN film on the surface is removed (see FIG. 2B).

Figure 2C:
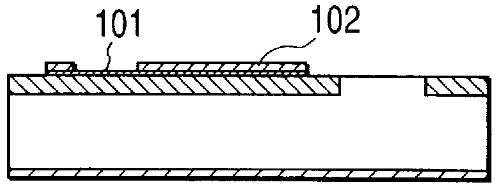
Figure 2D:
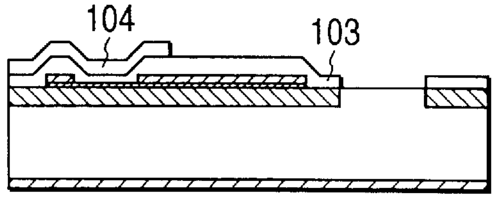

Then, there are laminated by means of sputtering, HfB2 as the resistive member and Al as the electrode material one after another on the substrate, and each of the electrodes 102 and heaters 101 are formed by means of photolithography as shown in FIG. 1 (see FIG. 2C).

After that, $SiO_2$ and Ta are laminated by means of sputtering, and the cavitation film and protection film are also formed by the application of the same technologies. In continuation, by means of photolithography, the Ta protection layer 104 is patterned to be left intact on the heater portion and its circumference as shown in FIG. 1. Also, $SiO_2$ film 103 is patterned to be left intact on the portions other than the locations where the pads for W.B. use and the elastic member portion are formed (see FIG. 2D).

Figure 2E:
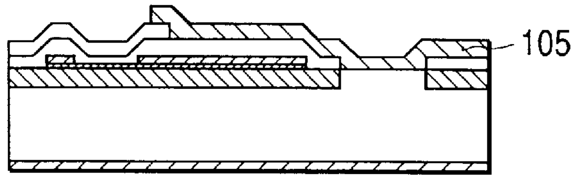

Lastly, epoxy resin 105, which has resistance to the anisotropic etching solution (alkaline solution), is coated as the organic resin in a thickness of 2.0 $\mu$m, and then, the resin 105 is patterned by means of photolithography to be left intact on the portions other than those where the heater unit and pads for W.B. use are located (see FIG. 2E). Thus, as shown in FIG. 1, the heater board is completed with 256 heaters are arranged in the density of 360 dpi.

Then, with photolithography, patterning is performed to eliminate only the aforesaid portion of the SiN film 112 on the reverse side so that etching is made executable on the portion of the substrate where the elastic member portion

Figure 2F:
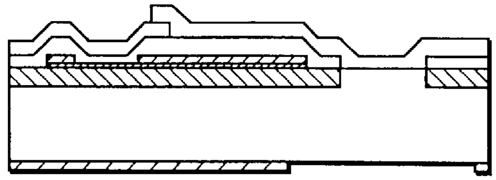

106 is formed on a part of the upper surface of silicon substrate 100, which is the reverse side of the heater board thus produced (see FIG. 2F)

With this SiN film 112 as the etching mask, a part of the portion of the silicon substrate 100 where the liquid chamber is formed is anisotropically etched to form the elastic member portion 106 provided with the membrane of epoxy resin in the liquid chamber formation portion.

Figure 2G:
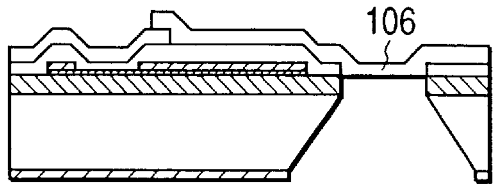
Figure 2H:
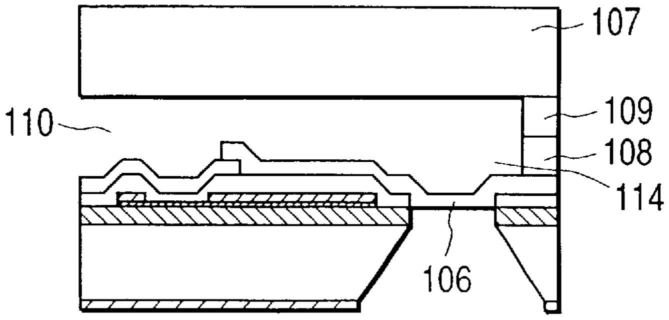

When the anisotropic etching is performed using the silicon substrate having the (100) plane, the dimension of the etching pattern is reduced at the vertical angle of 125.3° as shown in FIG. 2G. Now, given the size of the elastic member portion as A μm perpendicular and B μm horizontal, the size of the pattern is defined as the perpendicular: A×2×{tan(90−54.7)× the thickness of the substrate} μm, the horizontal: B×2×{tan(90−54.7)× the thickness of the substrate} μm.

In accordance with the present embodiment, the size of the elastic member portion is defined as perpendicular: 500 μm, horizontal: 500 μm, and each one of them is arranged in the liquid chamber per 32 heaters. The size of the pattern on the reverse side is as follows in accordance with the formula described above:

Perpendicular: 1,385 μm

Horizontal: 1,385 μm

Also, in accordance with the present embodiment, the silicon substrate having (100) plane is used. However, when the silicon substrate having (110) plane should be used for the execution of anisotropic etching, it is possible to perform this etching in the direction perpendicular to the (110) plane with an adjustment to match the patterning surface of (110) plane with the (111) plane. Therefore, it should be good enough if only the patterning is performed in the same dimensions as those of the elastic member portion.

For any one of the anisotropic etchings, 50% KOH solution is used as its etching solution, and the etching temperature is set at 90° C. The heater board thus produced is shown in FIG. 2G. Then, the nozzle wall 108 is formed with the negative type dry film. There is also arranged the ceiling plate glass which is provided with the excavated portion having the liquid chamber and ink supply opening formed by the negative type the negative type dry film. Then, on the upper portion of the nozzle wall, this ceiling plate glass is bonded to form the discharge element.

This discharge element and the PCB having the driver IC mounted thereon are bonded to an aluminum base plate, respectively, and connected by means of wire bonding. Further, the ink supply system is bonded to the ceiling plate glass to complete the ink jet head shown in FIG. 3 and FIG. 4 (see FIG. 2H). The experimentally produced head is provided with 256 nozzles in the nozzle density of 360 dpi.

This experimentally produced head is driven to print in the following driving condition:

Driving voltage: 1.15 times the discharge initiation voltage

Driving pulse width: 3.00 μsec

Driving frequency: 7.0 kHz

The head thus produced indicates a sufficiently satisfactory standard, because the delay of refilling affected by the driving of adjacent nozzles is made smaller, and the fluctuation of discharge amounts is also smaller. Consequently, it is observed that the level of prints also is high and sufficiently satisfactory.

With this experiment, it is considered to have achieved the objectives discussed earlier with the provision of the elastic member portion which is precisely incorporated on the substrate. Moreover, with the excellent durability of the head, there is no degradation of its quality observed, and the printing is also stabilized even for a long-term use.

Also, the elastic member portion formed on the substrate enables the photolithographical technologies to be utilized when this member is incorporated on the substrate in the manufacture steps of the heater board. Here, therefore, the manufacture costs are not particularly increased.

In accordance with the present embodiment, the epoxy resin has been used as the organic resin to form the elastic member portion. However, the present invention is not necessarily limited to the use of epoxy resin. It may be possible to use any kind of resin without problem if only such resin has resistance to the anisotropic etching solution.

As described above, in accordance with a method of the present invention for manufacturing ink jet recording head, it is possible to incorporate the elastic member portion on the substrate at lower costs of manufacture. Then, with the provision of the elastic member portion, it becomes possible to absorb the pressure vibrations in the liquid chamber due to the execution of discharges, and then, suppress the vibrations of menisci at discharge ports. Thus, the present invention demonstrates the remarkable effect in obtaining an excellent ink jet recording head capable of performing stable ink discharges.

What is claimed is:

1. A method for manufacturing an ink jet recording head having an orifice for liquid discharge, a nozzle communicating with the orifice, an electrothermal converting member arranged on a substrate in the nozzle to form a bubble in the liquid by generating thermal energy, and a liquid chamber communicating with the nozzle to supply the liquid to the nozzle, said method comprising the steps of:

preparing the substrate to be a silicon substrate having (100) plane or (110) plane crystal axes;

forming an organic resin layer at least in a liquid chamber portion of the substrate, on an electrothermal converting member side of the substrate; and forming an elastic member portion of the organic resin layer in the liquid chamber portion of the substrate by removing by means of anisotropic etching a part of the the liquid chamber portion of the substrate from a side of the substrate opposite to the organic resin layer.

2. A method for manufacturing an ink jet recording head according to claim 1, wherein said organic resin layer functions dually to be the protection layer for said electrothermal converting member.

3. A method for manufacturing an ink jet recording head according to claim 1, wherein said organic resin layer is epoxy resin.

4. A method for manufacturing an ink jet recording head according to claim 2, wherein said organic resin layer is epoxy resin.

* * * * *

UNITED STATES PATENT AND TRADEMARK OFFICE
CERTIFICATE OF CORRECTION

PATENT NO. : 6,305,080 B1
DATED : October 23, 2001
INVENTOR(S) : Hirokazu Komuro et al.

It is certified that error appears in the above-identified patent and that said Letters Patent is hereby corrected as shown below:

Title page,
Item [56], References Cited, OTHER PUBLICATIONS, after "Bassons, E.", "Fabrciation" should read -- Fabrication --.

Column 1,
Line 21, "Particularly," should read -- Particularly --;
Line 22, "and" should be deleted, "kinds" should read -- kinds of --; and "of" (second occurrence) should be deleted;
Line 23, "equipment" (first occurrence) should read -- equipment, --;
Line 25, "devices" should read -- device, such --; and "as" (second occurrence) should read -- to --;
Line 26, "the output of" should read -- output --;
Line 28, "printer" should read -- printers --; and "kinds, there" should read -- kinds --;
Line 38, "including" should read -- include--;
Line 48, "of" should be deleted; and
Line 62, "an one" should read -- one --.

Column 2,
Line 29, "numbers" should read -- number --;
Line 33, "hence" should read -- thus --; and
Line 46, "maintain" should read -- maintain, --.

Column 3,
Line 54, "the" should be deleted.

Column 4,
Line 40, "thickness" should read -- a thickness --;
Line 42, "HfB2" should read -- $HfB_2$ --; and
Line 63, "are" should be deleted.

UNITED STATES PATENT AND TRADEMARK OFFICE

CERTIFICATE OF CORRECTION

PATENT NO. : 6,305,080 B1

DATED : October 23, 2001

INVENTOR(S) : Hirokazu Komuro et al.

It is certified that error appears in the above-identified patent and that said Letters Patent is hereby corrected as shown below:

<u>Column 5,</u>
Line 27, “should be” should read -- is --; and
Line 41, “the negative type” (second occurrence) should be deleted.

<u>Column 6,</u>
Line 48, “the” (first occurrence) should be deleted.

Signed and Sealed this

Twentieth Day of August, 2002

*Attest:*

JAMES E. ROGAN

*Attesting Officer* *Director of the United States Patent and Trademark Office*